US006299812B1

(12) United States Patent
Newman et al.

(10) Patent No.: US 6,299,812 B1
(45) Date of Patent: Oct. 9, 2001

(54) METHOD FOR FORMING A FIBERS/ COMPOSITE MATERIAL HAVING AN ANISOTROPIC STRUCTURE

(75) Inventors: Gerard K. Newman; Robert L. Shambaugh; Jeffrey H. Harwell, all of Norman, OK (US)

(73) Assignee: The Board of Regents of the University of Oklahoma

( * ) Notice: Subject to any disclaimer, the term of this patent is extended or adjusted under 35 U.S.C. 154(b) by 0 days.

(21) Appl. No.: 09/374,775

(22) Filed: Aug. 16, 1999

(51) Int. Cl.[7] .............................. C01B 31/02; C30B 29/02
(52) U.S. Cl. ................................... 264/176.1; 264/210.1; 264/211.12; 264/211.13
(58) Field of Search .......................... 428/292.1; 264/299, 264/176.1, 177.17, 177.2, 210.1, 210.12, 211.13

(56) References Cited

U.S. PATENT DOCUMENTS

| 4,663,230 | 5/1987 | Tennent ................................ 428/367 |
| 5,165,909 | 11/1992 | Tennent et al. ....................... 423/447 |
| 5,482,601 | 1/1996 | Ohshima et al. ..................... 204/173 |
| 5,543,378 | 8/1996 | Wang ................................... 502/174 |
| 5,578,543 | 11/1996 | Tennent et al. ....................... 502/180 |
| 5,648,056 | 7/1997 | Tanaka ................................. 423/445 |
| 5,707,916 | 1/1998 | Snyder et al. ........................ 502/180 |
| 5,744,235 | 4/1998 | Creechan .............................. 428/364 |
| 5,753,088 | 5/1998 | Olk ....................................... 204/173 |
| 5,773,834 | 6/1998 | Yamamoto et al. .................. 250/423 |
| 5,780,101 | 7/1998 | Nolan et al. .......................... 427/216 |
| 5,877,110 | 3/1999 | Snyder et al. ........................ 502/180 |

FOREIGN PATENT DOCUMENTS

| WO9842620 | 1/1998 | (WO) . |
| WO9839250 | 8/1998 | (WO) . |

OTHER PUBLICATIONS

Murphy, J, Reinforced Plastics Handbook, p. 167, 1994.*

* cited by examiner

Primary Examiner—Richard Weisberger
(74) Attorney, Agent, or Firm—Dunlap, Codding & Rogers, P.C.

(57) ABSTRACT

A method for forming fibers/composite material having an anisotropic structure, comprising the steps of mixing an effective amount of fibers with a matrix material to form a deformable mixture containing less than about 96 weight percent of the fibers to about parts per billion of the fibers and wherein the fibers are randomly oriented in the deformable mixture. The deformable mixture can be extruded, stretched or otherwise deformed to form an extrudate. Pressure is applied about the extrudate to substantially compress the fibers in the extrudate to provide the fibers/composite material having an anisotropic structure.

19 Claims, 1 Drawing Sheet

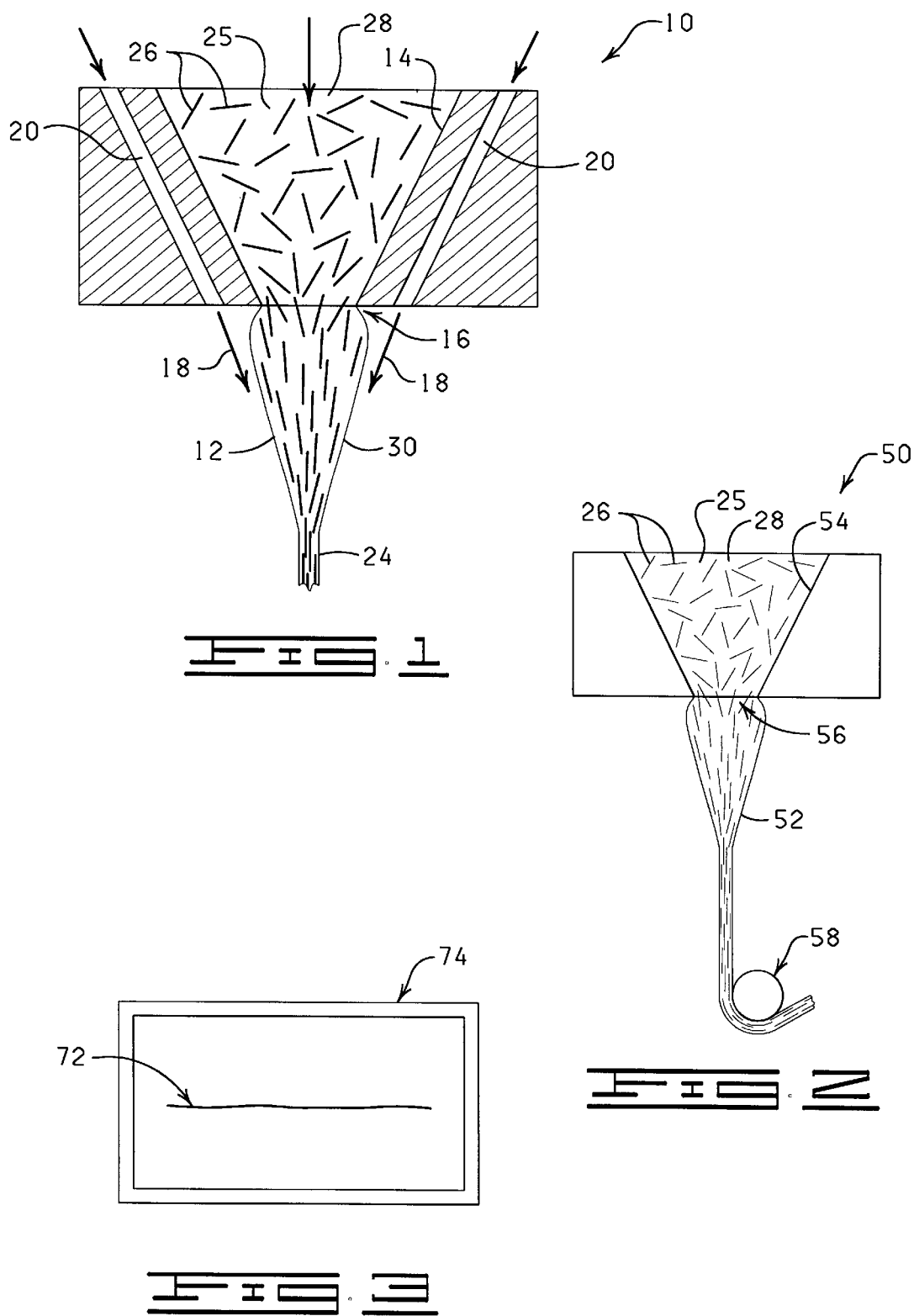

METHOD FOR FORMING A FIBERS/COMPOSITE MATERIAL HAVING AN ANISOTROPIC STRUCTURE

BACKGROUND OF THE INVENTION

Innovations in materials have driven much of the technological progress throughout the century. Today, the potential applications of a new unforeseen pure molecular form of carbon known as carbon nanotubes, is engendering tremendous excitement across the scientific community. Since their discovery, reports of their ever more outstanding and exciting properties seems to foreshadow the advent of the new and quite remarkable carbon age. Many countries have now identified such molecules as a strategic commodity and are making major commitments toward their production. Such countries see potential applications of such novel pure carbon molecules across their spectrum of industry. The usage of carbon nanotubes in high-tech composites alone offers tremendous potential. Theoretical calculation of stress and strain for some carbon nanotube molecules indicate that as carbon substitutes in high-tech composites they could provide an even greater leap forward in material advantages than existing carbon composites have had over previously used materials. Already, such carbon composites have revolutionized aircraft design and in the process given the United States significant military and economic advantages. It is precisely for such reasons that, worldwide, a push is on to develop and mass produce this new carbon form. At ⅙th the weight of steel and 50 to 150 times stronger, carbon nanotubes are, in essence, an ideal fiber for enhanced composite materials. Previous efforts to commercialize carbon nanotubes have revealed serious production problems.

It would represent an advance in the state of the art if a method were developed which could facilitate the manufacture of products with fibers, such as carbon nanotubes and/or nanowires, nanoropes, or other ultrasmall fibers. It is to such an improved method for facilitating the manufacture of products that the present invention is directed.

SUMMARY OF THE INVENTION

The present invention is a method for mass producing fibers/composite material having an anisotropic structure that can be specifically utilized in forming various desirable products, such as a composite shield for electromagnetic radiation, for example. When the method is utilized to produce elongate fibers, the fibers possess highly aligned internal fibers, such as carbon nanotubes positioned parallel to the length of the fiber. The high degree of parallel alignment of the carbon nanotubes impart electrical conductivity significantly higher than that of other polymers made electrically conducting by the addition of metal or carbon powders. This is especially true given that certain nanotubes, i.e., those having a ring pattern in the graphitic wall of the nanotubes align with the carbon nanotubes axis, are used. Nanotubes with this pattern have conductivity approaching that of gold.

Broadly, the fibers/composite material is produced by mixing an effective amount of fibers with a matrix material to form a mixture containing from about 96 weight percent of the fibers to parts per billion (ppb) of the fibers and wherein the fibers are randomly oriented in the deformable mixture. The mixture is then passed through an orifice or capillary (e.g. extruded), or pulled or stretched to form an extrudate and to create an anisotropic structure, e.g. an enhanced orientation/alignment of the fibers along the longitudinal axis of the extrudate. Thereafter, pressure can be applied about the extrudate to substantially compress the fibers in the extrudate and to enhance the anisotropic structure of the extrudate. The fibers/composite material is a highly-moldable, composite material with significant potential in military applications and which by the proper choice of components may have desirable properties, such as ultra-strength, an increased conductivity orders of magnitude over that of even a normally conductive polymer, an increased semi-conductive property, or an enhanced optical property.

Other advantages and features of the Applicants' unique methods and products produced thereby will become apparent to those of ordinary skill in the art upon a reading of the following detailed description with reference to the attached drawings and appended claims.

BRIEF DESCRIPTION OF THE SEVERAL VIEW OF THE DRAWING

FIG. 1 is a side elevational, schematic representation of a melt blowing process in accordance with the present invention for forming fibers/composite material having an anisotropic structure.

FIG. 2 is a side elevational, schematic representation of a melt spinning process in accordance with the present invention for forming fibers/composite material having an anisotropic structure.

FIG. 3 is a schematic representation of a "pyrolysis" procedure for converting the fibers/composite material into a pure carbon form.

DETAILED DESCRIPTION OF THE INVENTION

The present invention is a method for producing fibers/composite material having an anisotropic structure which can be commercially produced utilizing commercially available equipment. In general, effective amounts of fibers are mixed with a matrix material to form a deformable mixture containing less than about 96 weight percent of the fibers to about parts per billion of the fibers and wherein the fibers are randomly oriented in the deformable mixture. The liquid mixture is then passed through an orifice or a capillary (e.g. extruded) to form an extrudate. Shear attenuation pressure is applied about the extrudate, either as the extrudate passes through the orifice or capillary, and/or after the extrudate passes through the orifice or capillary, to substantially compress the fibers in the extrudate and to provide the fibers/composite material having an anisotropic structure, e.g. the fibers/polymer material is substantially aligned with the longitudinal axis of the extrudate. The shear attenuation pressure is preferably applied through a melt blowing process, although, other processes could also be utilized to provide the shear attenuation pressure to the extrudate, such as a melt spinning process, or a gel spinning process.

The term "fibers", as used herein, broadly refers to any fibers which can be mixed with a matrix material to form the fibers/composite material having the anisotropic structure without any adverse effects. Examples of fibers which can be employed in the practice of the present invention include, but are not limited to, polymeric fibers, pure metal fibers, metal alloy fibers, pure carbon fibers, fibrous carbon fibers, fibrous carbon black fibers, or fibers composed of carbon and metals, metal oxide, metal oxide alloy, carbon nanotubes and other fibrous materials whether carbon based, (including polymer fibers themselves, carbon/boron fibers, carbon/nitride fibers and the like); or inorganic based, (such as metal oxide fibers, including glass fibers and glass alloy fibers as well as organic/inorganic hybrid fibers). Further, such fibers may be physically mixed with/into the matrix material including a polymer phase composed of a blend/mixture of several different polymers with or without additives to enhance homogenization of the total solution. The size of the fibers used herein can vary widely but will generally have a diameter of from about 0.66 nanometers to about 5 microns. Further, the fibers may be nanowires, nanoropes, nanotubes, microtubes, microfibers, combinations thereof and the like and such fibers can be carbon based fibers or various chemical compositions or single elements, alloys, mixtures or chemical compositions, whether single wall or multi wall tubes or solid in form.

The term "matrix material" as used herein, broadly refers to any composition capable of functioning as the matrix constituent of the fibers/composite materials produced by the present invention. Examples of suitable matrix materials which can be employed in the practice of the present invention, include, but are not limited to, metal, glass, metal alloy, metal oxide glass or alloy thereof, polymer, such as thermoplastics, or any suitable blends thereof that can be prepared to have a viscosity suitable for extruding, stretching, shearing or otherwise deforming of the deformable mixture containing the matrix material and the fibers in a preferential direction to create the anisotropic structure, e.g. an enhanced orientation/alignment of the fibers within the deformable mixture, in the direction the deformable mixture has been pulled, stretched, extruded, sheared, and combinations thereof or otherwise deformed and which can be mixed with the "fibers" to produce the fibers/composite materials having an anisotropic structure without any adverse effects. Any polymer capable of achieving the above described results can be utilized. Examples of matrix materials which will function as a "matrix material" as used herein, are polyethylene, poly(para-phenylenevinylene), polypyrrole, polypropylene, nylon-6, polystyrene, polytrifluorochloroethylene and Resin Epon-812 and combinations thereof. Further, the "matrix material" could be organic/inorganic hybrid based.

A suitable viscosity of the deformable mixture can be adjusted so that the deformable mixture can be pulled/stretched/extruded/sheared or otherwise deformed by any suitable process, such as melting the deformable mixture, or mixing a solvent with the deformable mixture.

For example, the transformation of the deformable mixture having the randomly arranged fibers into the fibers/composite material having an anisotropic structure can be enhanced by increasing the temperature of the deformable mixture up to and above a temperature where the matrix phase is considered a melted phase. By further increasing the temperature of the deformable mixture its viscosity will decrease thus enhancing its fluid or fluid-like properties thus further enhancing its ability to be stretched, pulled, extruded, or combinations thereof or otherwise deformed in a preferential direction.

As a further example, the transformation of the deformable mixture into the fibers/composite material having an anisotropic structure may, in some instances, be enhanced by the addition of a solvent that dissolves portions of some or all of the components considered to compose the matrix material of the deformable mixture. The solvent dissolution of the matrix material increases its fluid or fluid-like properties and by doing so allows its deformation with less force and thus increases its ability to be stretched, pulled, extruded, or otherwise deformed in a preferential direction. Only those small volumes of solvents are required that contribute to lower viscosity of the deformable mixture while simultaneously maintaining the self adhesive quality of the matrix phase in such a way that it maintains its self continuity and may be still stretched, pulled, extruded or otherwise deformed.

Further, plastic deformation of materials including some metals and metal alloys may be accomplished by the application of significant pressures or forces. Likewise, the application of pressure to the deformable mixture can improve, create and/or initiate the stretching, pulling, extruding, or deforming of the deformable mixture into the fibers/composite material having an anisotropic structure. Therefore, depending on the particular properties of the deformable mixture, low to extremely high pressures can contribute to formation of the preferentially aligned fibers within the deformable mixture by aiding the deformable mixture in being deformed, stretched, extruded, pulled or otherwise linearized into a fiber, tube, or rope-like form.

Examples of processes that transform bulk mixtures into fibers, tubes or rope-like structures are those processes known in the art as "wet spinning", "gel spinning", "melt spinning", "melt blowing", or "extrusion". These processes are well known in the art and a detailed discussion of each of these processes is not deemed necessary to teach one of ordinary skill in the relevant art to make and use the present invention.

Referring now to FIG. 1, an example of a process for producing the fibers/composite material having an anisotropic structure is illustrated using conventional melt blowing equipment 10. As background, melt blowing is one of many fiber handling processes employed to produce non-woven mats of fiber. In the melt blowing process, a fine stream 12 (referred to herein as an "extrudate") is extruded or passed from a hopper 14 through an orifice or capillary 16 and into a high velocity gas stream 18 provided through channels 20 positioned generally adjacent to the orifice 16. The force of the high velocity gas stream rapidly stretches the extrudate 12 and attenuations the diameter of the extrudate 12 so as to form the extrudate 12 into filaments 24 of very small diameters. Melt blown filaments 24 typically range from about 30 microns in diameter to as fine as about 0.1 microns in diameter. This extreme fineness gives melt blown filaments 24 advantages in uses such as insulation, absorbent material, and filters. The melt blowing process is described in detail in U.S. Pat. Nos. 5,231,463, and 5,504,559 issued to Shambaugh, the entirety of the content of both patents being hereby expressly incorporated herein by reference. The orifice 16 of the melt blowing equipment 10 can have a diameter which is effective to provide shear attenuation forces on the extrudate 12 as the extrudate 12 passes through the orifice 16, without producing any undesirable effects in the extrudate 12. For example, the orifice 16 can have a diameter of about 0.5 mm.

To produce a deformable mixture 25, an effective amount of fibers 26 is mixed with a matrix material 28. The method for mixing the fibers 26 with the matrix material 28 depends on the particular fibers 26 and matrix material 28 utilized. For example, when fibrous carbon nanotubes are utilized as the fibers 26, and polypropylene is utilized as the matrix material 28, the method of mixing the fibers 26 with the matrix material 28 is as follows. Effective amounts of polypropylene powder is mixed with a predetermined quantity of fibrous carbon nanotubes in a weight percentage of fibrous carbon nanotubes less than about 96 percent to about parts per billion of the fibers and then melted and homogenized in a heated screw type mixer before introduction or during introduction into the hopper 14 of the melt blowing equipment 10.

As another example, when carbon nanotubes are utilized as the fibers 26, and Poly(para-phenylenevinylene) is utilized for the matrix material 28, the method for mixing the fibers 26 with the matrix material 28 is as follows. An effective amount of fibrous carbon nanotubes and Poly(paraphenylenevinylene) are mixed together in the presence of an effective amount of a solvent, such as toluene and then sonicated. The deformable mixture 25 is then warmed to evaporate the solvent-toluene and thereafter introduced into the hopper 14 of the melt blowing equipment 10.

As yet another example, when fibrous carbon nanotubes are utilized as the fibers 26, and Resin Epon-812 (Epon 812 is a polymeric material obtainable from Shell Chemical Company) is utilized as the matrix material, the method of mixing the fibers 26 with the matrix material 28 is as follows. An effective amount of a fibrous carbon nanotubes are dispersed randomly in a liquid epoxide-base resin by the mechanical mixing of the fibrous carbon nanotubes (pristine fibrous carbon nanotubes and fibrous carbon nanotubes sonicated in ethanol) in the resin Epon-812 with a glass rod. Then, the resin Epon-812 containing the fibrous carbon nanotubes is prepared by mixing the epoxy resin (Epon-812), curing agents dodecenylsuccinic anhydrided (MNA) and methyl nadic anhydride (MNA), and an accelerating agent [2,4,6-tris(dimethylaminomethyl)-phenol (DMP 30)] by magnetic stirring for about two hours. The resin Epon-812 mixture, after evacuation to remove any trapped air bubbles, is poured into blocks of capsular shape and hardened by keeping it over 24 hours at about 60 degrees C. The blocks are then ground and introduced in the form of pellets to the hopper 14 of the melt blowing equipment 10.

Procedure for Melt Blowing

The deformable mixture 25 containing the fibers 26 and the matrix material 28 is introduced into the hopper 14 of the melt blowing equipment 10. The melt blowing equipment 10 can be a ¾ inch Brabender extruder with a 20:1 L/D ratio and a 3:1 compression ratio.

It is possible to reach temperatures during extrusion of up to about 400 degrees C. The temperature at which the deformable mixture 25 is extruded can vary widely and will generally be based on the properties of the matrix material 28 of the deformable mixture. The temperature of the deformable mixture 25 is set at a level that is high enough for the process to take place and low enough to prevent the onset of excessive degradation. Generally, the temperature at which the deformable mixture 25 is extruded varies from about 50 degrees C. to about 100 degrees C. above the melting point of the matrix material 28 used in the formation of the deformable mixture 25.

In FIG. 1, a conventional slot die is shown. In the slot die, the high velocity gas stream 18, such as air, is forced through two narrow parallel channels 20. Although the slot die is shown, it should be understood that other types of dies can be utilized in the formation of the filaments 24 having an anisotropic structure. For example, a die having an annular channel extending around an orifice for passing the deformable mixture 25 there through can be utilized.

The temperature of the gas in the high velocity gas stream 18 can vary widely and will depend on the properties of the matrix material 28 used in the formation of the deformable mixture. The temperature of the high velocity gas stream 18 is sufficient to attenuate the extrudate 12 while at the same time preventing excessive degradation of the extrudate 12 or other undesirable properties. For example, compressed air (ultimately forming the high velocity gas stream 18) is passed through two 1500 W coiled gas heaters operating in parallel to heat the high velocity gas stream 18 to the desired temperature. Thereafter, the heated high velocity gas stream 18 is directed through the channels 20 to engage an exterior surface 30 of the extrudate 12. The temperature ranges of the high velocity gas stream 18 can vary widely based on the properties of the matrix material 28 utilized in the formation of the deformable mixture 25, and will desirably typically be between about 50 degrees C. to about 100 degrees C. above the temperature of the extrudate 12.

The velocity or gas flow rate of the high velocity gas stream 18 passing through the channels 20 can vary widely depending on the properties of the matrix material 28 utilized in the formation of the deformable mixture 25, the desired diameter of the extrudate 12, and the resin flow rate.

The resin flow rate, i.e. the rate of flow of the deformable mixture 25 through the orifice 16 can vary widely depending on the properties of the matrix material 28 utilized in the formation of the deformable mixture 25, and the desired diameter of the filaments 24. For example, assuming that the desired diameter of the filaments 24 is about 1 micron and a desired production velocity of the filaments 24 is 550 m/sec, the resin flow rate can be no greater than about 0.023 cc/min/orifice.

The extrusion of the deformable mixture 25 through the orifice 16 creates an enhanced orientation or alignment of the fibers 26 within the deformable mixture 25 in the direction of travel of the extrudate 12. The contacting of the high velocity gas stream 18 moving at subsonic to supersonic velocity in the direction of travel of the extrudate 12 creates a drag force on the extrudate 12 that increases the stretching or deforming of the extrudate 12 in the same direction of travel, while simultaneously decreasing the diameter of the extrudate 12.

Procedure for Melt Spinning

Referring now to FIG. 2, another example of a process for producing the fibers/composite material having an anisotropic structure is illustrated using conventional melt spinning equipment 50. As background, melt spinning is one of many fiber handling processes employed to produce fiber, tube, rope-like structures. The deformable mixture 25 is prepared in an identical manner as described above. In the melt spinning process, a fine stream 52 (referred to herein as an "extrudate") is extruded or passed from a hopper 54 through an orifice or capillary 56. The extrusion of the deformable mixture 25 through the orifice or capillary 56 enhances the orientation/alignment of the fibers 26 in the deformable mixture 25. The extrudate 52 is wound onto a spool 58 which further stretches the extrudate 52 while simultaneously decreasing the diameter of the extrudate 52 and further enhancing the orientation or alignment of the fibers 26 in the deformable mixture 25. Thus, the fibers/composite material has an anisotropic structure, as discussed above.

Conversion of the Fibers/Composite Material

Referring now to FIG. 3, a plurality of fibers/composite materials with each having an anisotropic structure can be woven and thereafter formed or molded into a predetermined structure 72, which is shown as a planar structure in FIG. 3 merely by way of example.

When the fibers/composite materials in the predetermined structure 72 include a polymeric matrix material, the predetermined structure 72 can be subjected to a procedure known as "pyrolysis" to convert the polymeric matrix material of the predetermined structure 72 into a pure carbon structure to enhance the strength of the predetermined structure 72. In general, the procedure of "pyrolysis"

involves the introduction of the predetermined structure 72 into an oven 74 which is thereafter filled with an inert gas, such as argon, helium or nitrogen. The oven 74 is then heated to a temperature ranging from about 650 degrees C. to about 1050 degrees C and maintained at such temperature for a period of time sufficient to convert the polymeric matrix material in the predetermined structure 72 into the pure carbon structure. When the internal fibers 26 are carbon based also, the entire predetermined structure 72 will be converted into a pure carbon fiber structure. The procedure known as "pyrolysis" is known in the art and a detailed discussion of same herein is not deemed necessary to teach one of ordinary skill in the art to make or use the present invention.

It should be appreciated that the laboratory procedures disclosed hereinabove may be adapted to commercial production of fibers/composite material having an anisotropic structure. Further, it is well within the scope of the present invention that the methods disclosed herein may be modified by the application of the wide variety of commercial production techniques to form fibers, tubes, or rope-like structures of the fibers/composite material having an anisotropic structure out of the deformable mixture 25, such as gel spinning, or wet spinning, which are known in the art. The above described process creates a useful fibers/composite material composed of some percentage of fibers 26 within the matrix material 28 whether or not, and to whatever degree, the fibers 26 are aligned preferentially with the composite fiber length. This procedure, in itself, allows one to affect the fibers/composite material's structural, electronic, and optical properties. Low concentrations to high concentrations of the fibers 26, in particular, the nanotubes, nanowires, nanoropes, and nano polymer fibers) may be used. A low concentration of fibers 26 added to the matrix material 28 may benefit electronic and optical properties by, in essence, doping the fibers/composite material. A low concentration of fibers 26 may also improve the crystalline properties of the fibers/composite material.

Changes may be made in the combinations, operations and arrangements of the various parts and elements described herein without departing from the spirit and scope of the invention as defined in the following claims.

What is claimed is:

1. A method for forming a fibrous carbon nanotube/composite structure, comprising the steps of:
   mixing an effective amount of fibrous carbon nanotubes with a matrix material to form a deformable mixture wherein the fibrous carbon nanotubes are randomly oriented in the matrix material, the deformable mixture containing less than about 96 weight percent of the fibrous carbon nanotubes;
   heating the deformable mixture to a temperature of from about 50 degrees C. to about 100 degrees C. above the melting point of the matrix material;
   passing the heated deformable mixture through an orifice to form an extrudate;
   directing a gas having a temperature of from about 50 degrees C. to about 100 degrees C. above the temperature of the extrudate onto an exterior surface of the extrudate to compress the extrudate and align the fibrous carbon nanotubes in the extrudate along the longitudinal axis of the extrudate.

2. A method as defined in claim 1, wherein the matrix material is selected from the group consisting of polyethylene, poly(para-phenylenevinylene), polypyrrole, polypropylene, nylon-6, polystyrene, polytrifluorochloroethylene and combinations thereof.

3. The method as defined in claim 1, wherein the fibrous carbon nanotubes include single-walled carbon nanotubes.

4. The method as defined in claim 1, wherein the fibrous carbon nanotubes include multi-walled carbon nanotubes.

5. The method as defined in claim 1, wherein the matrix material includes a polymeric matrix material, and after the step of directing the gas, the method further comprises the steps of:
   forming the extrudate into a predetermined structure;
   introducing the predetermined structure into an oven;
   filling the oven with an inert gas; and
   heating the predetermined structure in the oven at a temperature and for a period of time sufficient to convert the polymeric matrix material in the predetermined structure to a pure carbon structure.

6. A method for forming a fibrous carbon nanotube/composite structure, comprising the steps of:
   mixing an effective amount of fibrous carbon nanotubes with a thermoplastic matrix material to form a deformable mixture wherein the fibrous carbon nanotubes are randomly oriented in the thermoplastic matrix material, the deformable mixture containing less than about 96 weight percent of the fibrous carbon nanotubes;
   heating the deformable mixture to a temperature of from about 50 degrees C. to about 100 degrees C. above the melting point of the thermoplastic matrix material;
   passing the heated deformable mixture through an orifice to form an extrudate;
   directing a gas having a temperature of from about 50 degrees C. to about 100 degrees C. above the temperature of the extrudate onto an exterior surface of the extrudate to compress the extrudate and align the fibrous carbon nanotubes in the extrudate along the longitudinal axis of the extrudate.

7. A method as defined in claim 6, wherein the thermoplastic matrix material is selected from the group consisting of polyethylene, poly(para-phenylenevinylene), polypyrrole, polypropylene, nylon-6, polystyrene, polytrifluorochloroethylene and combinations thereof.

8. The method as defined in claim 6, wherein the fibrous carbon nanotubes include single-walled carbon nanotubes.

9. The method as defined in claim 6, wherein the fibrous carbon nanotubes include multi-walled carbon nanotubes.

10. The method as defined in claim 6, wherein the thermoplastic matrix material includes a polymeric matrix material, and after the step of directing the gas, the method further comprises the steps of:
   forming the extrudate into a predetermined structure;
   introducing the predetermined structure into an oven;
   filling the oven with an inert gas; and
   heating the predetermined structure in the oven at a temperature and for a period of time sufficient to convert the polymeric matrix material in the predetermined structure to a pure carbon structure.

11. A method for forming a fibrous carbon nanotube/composite structure, comprising the steps of:
   mixing an effective amount of fibrous carbon nanotubes with a matrix material to form a deformable mixture wherein the fibrous carbon nanotubes are randomly oriented in the matrix material, the deformable mixture containing less than about 96 weight percent of the fibrous carbon nanotubes, the fibrous carbon nanotubes including single-walled nanotubes;
   heating the deformable mixture to a temperature of from about 50 degrees C. to about 100 degrees C. above the melting point of the matrix material;

passing the heated deformable mixture through an orifice to form an extrudate;

directing a gas having a temperature of from about 50 degrees C. to about 100 degrees C. above the temperature of the extrudate onto an exterior surface of the extrudate to compress the extrudate and align the fibrous carbon nanotubes in the extrudate along the longitudinal axis of the extrudate.

12. The method as defined in claim 11, wherein the matrix material is selected from the group consisting of polyethylene, poly(para-phenylenevinylene), polypyrrole, polypropylene, nylon-6, polystyrene, polytrifluorochloroethylene and combinations thereof.

13. The method as defined in claim 11, wherein the fibrous carbon nanotubes include multi-walled carbon nanotubes.

14. The method as defined in claim 11, wherein the matrix material includes a polymeric matrix material, and after the step of directing the gas, the method further comprises the steps of:

forming the extrudate into a predetermined structure;

introducing the predetermined structure into an oven;

filling the oven with an inert gas; and heating the predetermined structure in the oven at a temperature and for a period of time sufficient to convert the polymeric matrix material in the predetermined structure to a pure carbon structure.

15. A method for forming a fibrous carbon nanotube/composite structure, comprising the steps of:

mixing an effective amount of fibrous carbon nanotubes with a matrix material to form a deformable mixture wherein the fibrous carbon nanotubes are randomly oriented in the matrix material, the deformable mixture containing less than about 96 weight percent of the fibrous carbon nanotubes, the fibrous carbon nanotubes including multi-walled nanotubes;

heating the deformable mixture to a temperature of from about 50 degrees C. to about 100 degrees C. above the melting point of the matrix material;

passing the heated deformable mixture through an orifice to form an extrudate;

directing a gas having a temperature of from about 50 degrees C. to about 100 degrees C. above the temperature of the extrudate onto an exterior surface of the extrudate to compress the extrudate and align the fibrous carbon nanotubes in the extrudate along the longitudinal axis of the extrudate.

16. A method as defined in claim 15, wherein the matrix material is selected from the group consisting of polyethylene, poly(para-phenylenevinylene), polypyrrole, polypropylene, nylon-6, polystyrene, polytrifluorochloroethylene and combinations thereof.

17. The method as defined in claim 15, wherein the fibrous carbon nanotubes include single-walled carbon nanotubes.

18. The method as defined in claim 15, wherein the matrix material includes a thermoplastic matrix material.

19. The method as defined in claim 15, wherein the matrix material includes a polymeric matrix material, and after the step of directing the gas, the method further comprises the steps of:

forming the extrudate into a predetermined structure;

introducing the predetermined structure into an oven;

filling the oven with an inert gas; and heating the predetermined structure in the oven at a temperature and for a period of time sufficient to convert the polymeric matrix material in the predetermined structure to a pure carbon structure.

\* \* \* \* \*